Jan. 17, 1956     T. A. RICCIO     2,731,223
TREE HOLDER
Filed March 1, 1955     2 Sheets-Sheet 1
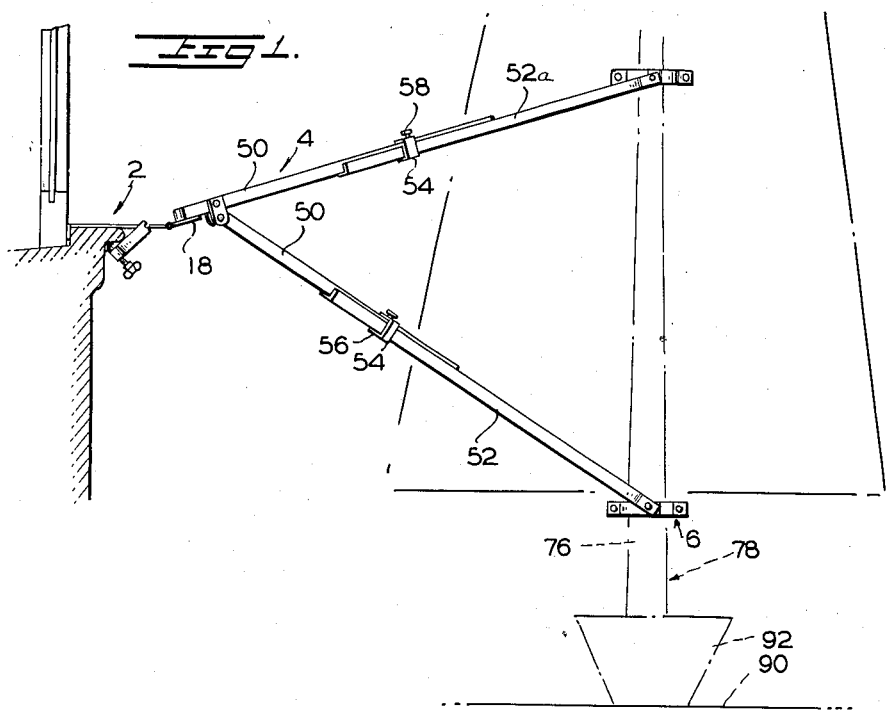
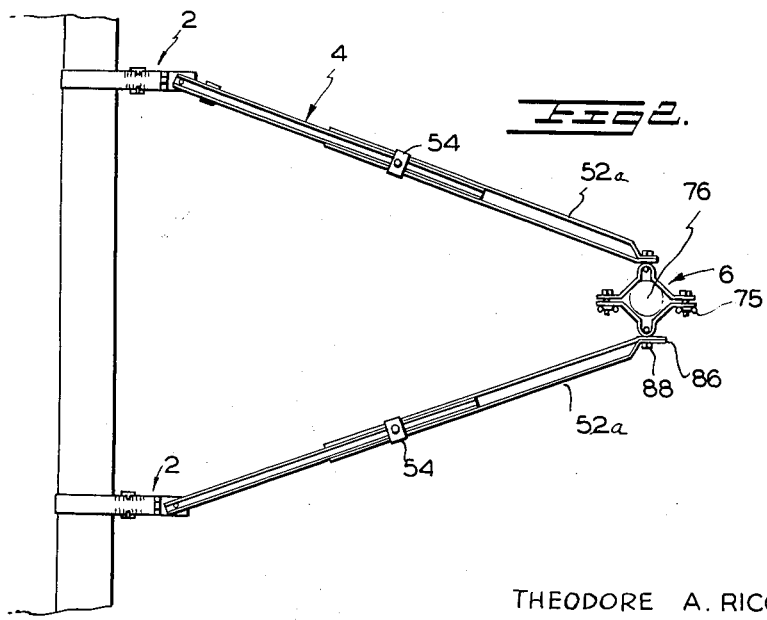
INVENTOR
THEODORE A. RICCIO
BY *Kemon and Palmer*
ATTORNEY Jan. 17, 1956
T. A. RICCIO
2,731,223
TREE HOLDER
Filed March 1, 1955
2 Sheets-Sheet 2
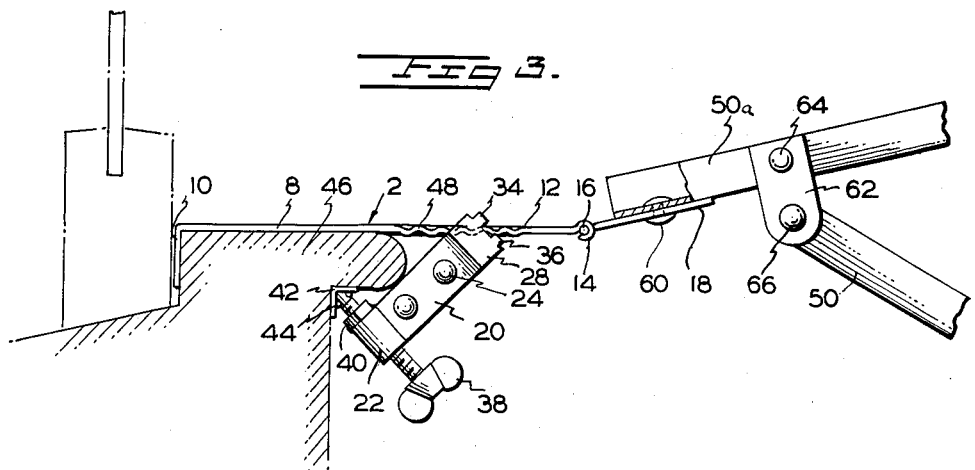
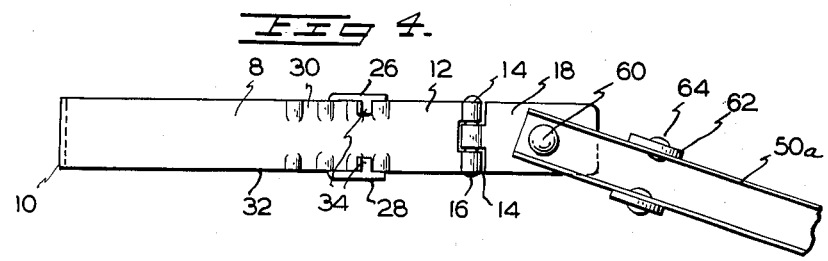
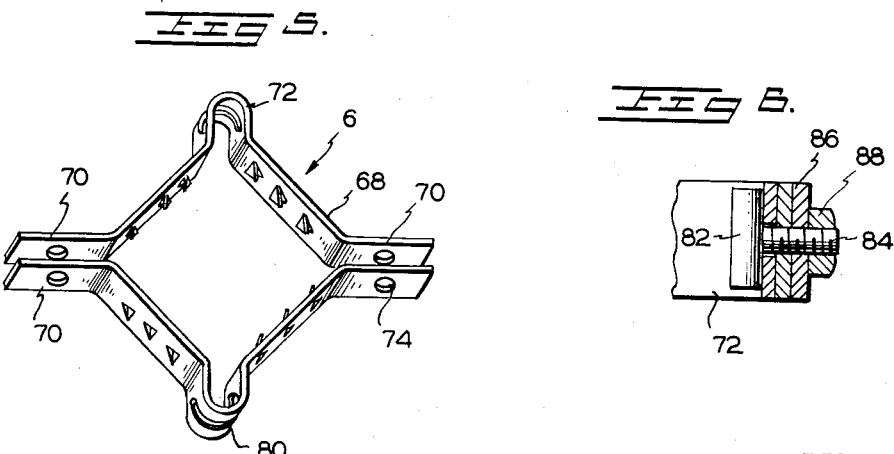
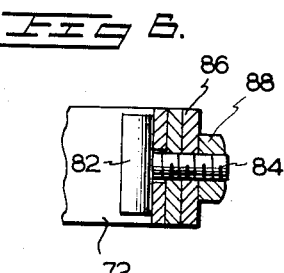
INVENTOR
THEODORE A. RICCIO
BY *Kemon and Palmer*
ATTORNEY

United States Patent Office 2,731,223
Patented Jan. 17, 1956

2,731,223
TREE HOLDER

Theodore A. Riccio, Newington, Conn.

Application March 1, 1955, Serial No. 491,341

4 Claims. (Cl. 248—41)

This invention relates to tree holders for supporting the trees or the like in an upright position. More particularly it relates to holders or stands for Christmas trees for use inside a building, house or similar structure.

Many forms of stands or holders for Christmas trees have been developed. Most of these are of a tripod type and have adjustable clamping means to enable trees with various size trunks to be mounted upon the holder or stand. In addition, some of these stands include adjusting means for elevating or otherwise moving one or more legs of the stand so that the tree can be positioned in a relatively vertical position.

The majority of available Christmas tree stands possess the disadvantage that the trees when held in the stands can be quite easily knocked over in various directions. Thus, with a tripod type stand, a push, such as by a child playing around a Christmas tree, in a direction directly opposite to any one of the legs of the stand, can easily topple the Christmas tree. Some of the stands of this general type attempt to overcome this disadvantage by extending the legs of the stand to a considerable length or by providing additional legs or additional devices all designed to create a larger bearing base for the tree and thus provide greater stability against toppling or movement of the tree. While this base broadening principle enables better stability in the mounted tree to be obtained, it creates additional problems because the extended legs or outer portions of the base require greater floor area on which to place the tree holder or stand. Hence, such stands may not be employed in mounting trees on stairways, small porches or the like.

The principal object of this invention is the provision of improved tree holders for holding Christmas trees or similar objects in a generally erect position.

Further objects of the invention include:

1. The provision of Christmas tree stands which hold the trees in such a rigid manner that the trees cannot readily be toppled or knocked down.

2. The provision of tree holders which require no connection or attachment at the base of the tree trunk thus allowing clear floor space around the base of the tree when it is mounted in an upright position.

3. The provision of Christmas tree stands or holders which permit Christmas trees to be mounted upon stairs, small porches or the like areas which provide only a very small space upon which the base of the tree may be supported.

4. The provision of a tree holder which enables a tree to be mounted, if desired, at an angle rather than limiting the position in which the tree can be mounted to a substantially vertical position.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

These objects are accomplished according to the present invention by the provision of a tree holder which comprises clamp means adapted to fasten to a rigid portion of a house or other structure, adjustable length arms pivotally connected to said clamp means and a plurality of tree clamps adapted to fasten about the tree trunk pivotally connected to said arms. More specifically, the new tree holders comprise upper and lower tree clamps adapted to fasten about a tree trunk, four adjustable length arms, two of the arms being pivotally connected to the upper tree clamp and the other two arms being similarly connected to the lower tree clamp, and a pair of clamp members such as window sill clamps, one of which is pivotally connected to one of the arms from the upper tree clamp and to one of the arms of the lower tree clamp while the other sill clamp is similarly connected to the remaining arms from the upper and lower tree clamps.

A more complete understanding of the new devices of this invention and their manner of use can be had by reference to the accompanying drawings in which:

Fig. 1 is a side elevation of a tree holder embodying the principles of this invention showing a portion of a trunk of a Christmas tree being held in a vertical position by the tree holder.

Fig. 2 is a top plan view of the holder Fig. 1.

Fig. 3 is an enlarged fragmentary side elevational view, partially in section, of the window sill or other building clamping means of the tree holder.

Fig. 4 is an enlarged fragmentary top plan view of the tree holder portion shown in Fig. 3.

Fig. 5 is a perspective view of one of the tree clamps which comprise the tree holders of the invention.

Fig. 6 is an enlarged fragmentary sectional view of the pivotal connection means for fastening one of the adjustable telescoping arms of the tree holder to the tree clamp as shown in Fig. 5.

Referring in detail to the drawings, the new tree holder of the invention basically comprises clamp means 2 adapted to fasten to a rigid portion of a building or other structure, adjustable length arms 4 pivotally connected to the clamp means 2 and tree clamps 6 pivotally connected to the arms 4.

Referring to Fig. 3, the clamp means 2 comprises an L-shaped strip 8 having a base portion 10 and a stem portion 12. Bearing members 14 on the end 12 of strip 8 carry a bolt 16 to which the clamp extension 18 is hinged.

Clamp means 2 also comprises a clamp fastener 20 which consists of a strip of metal bent near its middle to form a tubular section 22 when the two portions of the metal strip are fixed against one another such as by rivets 24. The free ends 26 and 28 of the strip forming the fastener 20 bend outwardly from the central portion of the fastener 20 to form a yoke which embraces the sides 30 and 32 of the clamp strip 8. Each of the end portions 26 and 28 of the fastener 20 have a pair of inwardly extending fingers 34 and 36. The top fingers 34 extend over the top surface of strip 8 while the bottom fingers 36 extend beneath the bottom of strip 8. The stem end 12 of strip 8 is provided with corrugations or similar indentations 48 which cooperate with the fingers 34 and 36 to prevent the fastener from sliding along the strip 8 when the clamp 12 is in correct position.

Tightening means 38, such as a wing bolt, screws into the tubular end 22 of fastener 20 which may be internally threaded or which may have welded thereto a nut 40 into which the wing bolt 38 threads. An angle piece 42 is carried by lugs 44 upon the end of the wing bolt 38 to serve as a bearing plate or member against which the force of wing bolt 38 can apply when the clamp 2 is mounted on the portion of a building or structure such as the window sill 46 shown in dotted sections in Figs. 1 and 3. Although the tree holder of this invention is primarily designed for clamping to a window sill as illustrated in the drawings, it is apparent that the clamp means 2 can be fastened to any other suitable portions of a building or structure such as a stair, bannister, door frame, fireplace mantle or the like.

As can be seen, the clamp means 2 is used by hooking the base end 10 of the strip 8 over the outside edge of the window sill 46 after which fastener 20 is moved as far as possible towards base 10 with the fingers 34 and 36 in engagement with the upper and lower faces of strip 8. Tightening of the wing bolt 38 against the angle base 42 which rests on the undersurface of sill 46, causes fastener 20 to move in a direction perpendicular to strip 8. This creates a twisting interlocking of fingers 34 and 36 with the strip 8 and forms a rigid connection of the clamp means 2 upon the window sill 46.

The adjustable link arms 4 each comprise a pair of rigid telescoping members 50 and 52 plus means 54 for locking the rigid members 50 and 52 against movement relative to one another.

The rigid members 50 and 52 are preferably U-shaped channel members or angle pieces although they may be formed of any other suitable rigid members such as telescoping tubes or the like. The locking means 54 preferably consist of a yoke 56 through which a bolt or thumb screw 58 is threaded.

The upper channel member 50a is fastened such as by rivet 60 to the hinged extension 18 of clamp means 2. The rivets 60 should be installed so that the channels 50 can rotate about the rivets.

Cleats 62 are fixed by rivets 64 upon both vertical sides of the channel member 50a and the lower telescoping arm 50 is pivotally carried upon these cleats by the bolt 66.

As can be seen, the hinged extension 18 permits the telescoping members 50 and 52 to be moved in any vertical position relative to clamp means 2. Likewise, the pivotal connection of channel member 50a to hinged extension 18 creates a lateral action pivot permitting the telescoping arms to be moved at any horizontal angle relative to clamp means 2. Furthermore, the vertical pivotal connection of the lower telescoping arm 50 with cleats 62 creates a vertical action pivot enabling the lower telescoping arm attached to the clamp means 2 to be moved in a wide variety of positions relative to the upper telescoping arm 50a.

The tree clamps 6 comprise a pair of rigid metal straps 68 each formed in the shape of a V with side extensions 70 and semi-circular apex portion 72. Each of the side extensions 70 have holes 74 drilled through about their center and these receive the wing bolts and nuts 75 as shown in Fig. 2, for clamping the V-shaped straps 68 about the trunk 76 of the Christmas tree 78.

Each of the semi-circular apex portions 72 of the strap 68 have slots 80 cut longitudinally therein. The rod shaped head 82 of a bolt 84 may be slipped through the slot 80 and then twisted normally of the slot axis (as shown in Fig. 6) after which the flattened end 86 of the channel members 52 or 52a, which are drilled to admit the bolt 84, may be fastened to the tree clamps 6 by threading the nuts 88 on the bolt 84. As can be seen from Fig. 2 or 6, this slotted arrangement on the semi-circular apex portion of tree clamps 6 creates a pivotal connection between the adjustable arms 4 and the tree clamps 6 to enable the adjustable arms to be fixed at widely varying angles to one another and to the tree clamps. At the same time, this slotted clamp construction permits the tree clamps 6 to be installed upon the tree without necessity of having the adjustable length arms attached thereto while the tree clamps are being fixed on the tree.

As shown in Fig. 1, the main weight of the tree is not supported by tree holders of this invention. Instead, the base of the tree 78 rests upon the floor 90 indirectly, if desired, through a pot 92 or similar vessel designed to hold water, fireproofing solutions or the like. On the other hand, the trunk of the tree is rigidly held against all lateral movement when a tree holder of this invention is installed as shown in Fig. 1. This permits the tree to be set up in a home without danger of it being easily knocked over by children playing around the tree or by other accidental contact of persons or articles with the tree. At the same time, the base of the tree, around which many forms of ornamentation or objects such as electric trains or the like are usually positioned when a Christmas tree is set up, is free of long leg extensions which normally stick out when the tree is supported by tripod stands such as commonly used for holding Christmas trees. Furthermore, since Christmas trees are usually placed in a corner of a room or other position so that persons usually do not walk behind the tree, the adjustable arms 4 and clamps 2 of the holders of this invention do not create any problems in extending from the tree and in fact may be usefully employed as supports for electric wires or the like which are generally required to be led-up to the tree for ornamenting the Christmas tree.

I claim:

1. A tree holder comprising upper and lower tree clamps adapted to fasten about a tree trunk, four adjustable length arms, two of the arms being pivotally connected to the upper tree clamp and the other two arms being similarly connected to the lower tree clamp, and a pair of window sill clamps, each sill clamp having pivotally connected thereto one of said arms from the upper tree clamp and each of said arms from the upper tree clamps having pivotally connected thereto one of the said arms from the lower tree clamp.

2. A Christmas tree holder comprising upper and lower tree clamps each comprising two V-shaped members adapted to be fastened together about a tree trunk, said members having semi-circular longitudinally slotted apex portions, an elongated head bolt extending through each of said apex portion slots with the bolt head bearing upon the inner surface of the apex portion, a telescoping arm fastened to each apex clamp portion by means of said bolts, a pair of L-shaped clamps adapted to hook over a window sill each comprising a hinged extension upon the stem end portion thereof and a clamp fastened having yoke means upon one end thereof for locking the fastener at an adjustable location on said L-shaped clamp stem portion and screw means on the other end of the fastener for forcing the fastener into locking engagement with said strip, one of the telescoping arms fastened to said upper tree clamp being pivotally connected to the hinged extension of one of said L-shaped clamps and the other arm being similarly connected to the hinged extension of the other L-shaped clamp and a cleat carried upon each of said pivotally connected arms near the pivotally connected end thereof, one arm fastened to each of said lower tree clamps being pivotally connected to one of said cleats.

3. A tree holder comprising clamp means adapted to fasten to a rigid portion of a building, adjustable length arms pivotally connected thereto and a plurality of tree clamps pivotally connected to said arms, said clamp means comprising an L-shaped strip adapted to hook over the top of a window sill, a hinged extension upon the stem end portion of said strip, and a clamp fastener comprising yoke means upon one end thereof for locking the fastener at an adjustable location on said strip and screw means on the other end of the fastener for forcing the fastener into locking engagement with said strip.

4. A tree holder comprising clamp means adapted to fasten to a rigid portion of a building, adjustable length arms pivotally connected thereto and a plurality of tree clamps pivotally connected to said arms, said tree clamps comprising a pair of V-shaped rigid strips having extensions at either side thereof carrying holes to receive fastening bolts, semi-circular apex portions having longitudinal slots therein, and bolts having elongated heads adapted to slip through said slots and be twisted so as to bear upon the inner surface of said semi-circular apex strap portions.

References Cited in the file of this patent

UNITED STATES PATENTS

| | | |
|---|---|---|
| 1,585,490 | Hainsworth | May 18, 1926 |
| 1,948,577 | Harsen | Feb. 27, 1934 |
| 2,552,074 | Thompson | May 8, 1951 |